United States Patent
Ladd et al.

(10) Patent No.: US 10,496,458 B2
(45) Date of Patent: *Dec. 3, 2019

(54) METHOD AND SYSTEM FOR TRANSFORMING INPUT DATA STREAMS

(71) Applicant: Open Text SA ULC, Halifax (CA)

(72) Inventors: Dennis D. Ladd, Acton, MA (US); Anders Hermansson, Askim (SE)

(73) Assignee: OPEN TEXT SA ULC, Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/228,346

(22) Filed: Dec. 20, 2018

(65) Prior Publication Data
US 2019/0121684 A1 Apr. 25, 2019

Related U.S. Application Data

(63) Continuation of application No. 15/174,591, filed on Jun. 6, 2016, now Pat. No. 10,210,028, which is a continuation of application No. 14/638,700, filed on Mar. 4, 2015, now Pat. No. 9,400,703, which is a continuation of application No. 13/745,096, filed on Jan. 18, 2013, now Pat. No. 9,047,146, which is a continuation of application No. 13/092,771, filed on Apr. 22, 2011, now Pat. No. 8,380,830, which is a continuation of application No. 12/573,352, filed on Oct. 5, 2009, now abandoned, which is a continuation of application No. 11/583,369, filed on Oct. 19, 2006, now abandoned, which is a continuation of application No. 10/184,430, filed on Jun. 28, 2002, now Pat. No. 7,127,520.

(51) Int. Cl.
*G06F 9/54* (2006.01)
*H04L 29/06* (2006.01)

(52) U.S. Cl.
CPC .............. *G06F 9/546* (2013.01); *G06F 9/542* (2013.01); *H04L 29/06* (2013.01); *H04L 69/04* (2013.01); *H04L 69/08* (2013.01)

(58) Field of Classification Search
CPC ......... G06F 9/546; G06F 9/542; H04L 29/06; H04L 69/04; H04L 69/08
See application file for complete search history.

(56) References Cited

U.S. PATENT DOCUMENTS

| 5,299,304 A | 3/1994 | Williams et al. |
| 5,524,250 A | 6/1996 | Chesson |
| 5,713,014 A | 1/1998 | Durflinger et al. |

(Continued)

FOREIGN PATENT DOCUMENTS

WO    WO 2006/041340    4/2006

OTHER PUBLICATIONS

Office Action for U.S. Appl. No. 10/184,430, dated Sep. 21, 2005, 12 pgs.

(Continued)

*Primary Examiner* — Wing F Chan
*Assistant Examiner* — Billy H Ng
(74) *Attorney, Agent, or Firm* — Sprinkle IP Law Group

(57) ABSTRACT

A system and method for processing an input data stream. An input connector module receives an input data streams. A job thread is operatively connected to the received input data stream and produces an output data stream. An output connector module supplies an output data stream.

18 Claims, 8 Drawing Sheets

(56) References Cited

U.S. PATENT DOCUMENTS

| | | | |
|---|---|---|---|
| 5,911,776 A | 6/1999 | Guck | |
| 5,970,490 A | 10/1999 | Morgenstern | |
| 5,995,996 A | 11/1999 | Venable | |
| 6,012,098 A | 1/2000 | Bayeh et al. | |
| 6,151,608 A | 11/2000 | Abrams | |
| 6,172,988 B1 | 1/2001 | Tiernan et al. | |
| 6,236,997 B1 | 5/2001 | Bodamer et al. | |
| 6,243,107 B1 | 6/2001 | Valtin et al. | |
| 6,263,332 B1 | 7/2001 | Nasr et al. | |
| 6,275,536 B1 | 8/2001 | Chen et al. | |
| 6,324,568 B1 | 11/2001 | Diec | |
| 6,336,124 B1 | 1/2002 | Alam et al. | |
| 6,336,139 B1 | 1/2002 | Feridun et al. | |
| 6,397,232 B1 | 5/2002 | Cheng-Hung et al. | |
| 6,484,178 B1 | 11/2002 | Bence, Jr. et al. | |
| 6,587,972 B1 | 7/2003 | Baird et al. | |
| 6,623,529 B1 | 9/2003 | Lakritz | |
| 6,643,701 B1 | 11/2003 | Aziz | |
| 6,668,254 B2 | 12/2003 | Matson et al. | |
| 6,748,020 B1 | 6/2004 | Eifrig et al. | |
| 6,782,379 B2 | 8/2004 | Lee | |
| 6,810,429 B1 | 10/2004 | Walsh et al. | |
| 6,816,871 B2 | 11/2004 | Lee | |
| 6,877,156 B2 | 4/2005 | Osborne et al. | |
| 7,043,687 B2 | 5/2006 | Knauss et al. | |
| 7,054,952 B1 | 5/2006 | Schwerdtfeger et al. | |
| 7,055,096 B2 | 5/2006 | Namioka | |
| 7,127,520 B2 | 10/2006 | Ladd et al. | |
| 7,143,087 B2 | 11/2006 | Fairweather | |
| 7,213,249 B2 | 5/2007 | Tung Loo et al. | |
| 7,216,163 B2 | 5/2007 | Sinn | |
| 7,225,256 B2 | 5/2007 | Villavicencio | |
| 7,257,600 B2 | 8/2007 | Matson et al. | |
| 7,284,235 B2 | 10/2007 | Nachmanson et al. | |
| 7,302,678 B2 | 11/2007 | Bohlmann et al. | |
| 7,308,399 B2 | 12/2007 | Falien-Bailey et al. | |
| 7,461,403 B1* | 12/2008 | Libenzi | H04L 63/145 709/224 |
| 7,478,402 B2 | 1/2009 | Christensen et al. | |
| 8,380,830 B2 | 2/2013 | Ladd et al. | |
| 8,788,699 B2 | 7/2014 | Kitagata | |
| 8,914,809 B1 | 12/2014 | Cohen | |
| 9,047,146 B2 | 6/2015 | Ladd et al. | |
| 9,237,120 B2 | 1/2016 | Cohen | |
| 9,400,703 B2 | 7/2016 | Ladd et al. | |
| 10,210,028 B2 | 2/2019 | Ladd | |
| 2001/0047369 A1 | 11/2001 | Aizikowitz et al. | |
| 2001/0056362 A1* | 12/2001 | Hanagan | G06Q 10/063 705/7.11 |
| 2002/0059076 A1 | 5/2002 | Grainger | |
| 2002/0083124 A1 | 6/2002 | Knox | |
| 2002/0083205 A1 | 6/2002 | Leon et al. | |
| 2002/0165975 A1 | 11/2002 | Abbott | |
| 2003/0023336 A1 | 1/2003 | Kreidler et al. | |
| 2003/0065623 A1 | 4/2003 | Corneil et al. | |
| 2003/0085902 A1 | 5/2003 | Vogelaar et al. | |
| 2004/0133635 A1 | 7/2004 | Spriestersbach | |
| 2004/0143738 A1 | 7/2004 | Savage | |
| 2005/0071150 A1 | 3/2005 | Nasypny | |
| 2005/0160086 A1 | 7/2005 | Haraguchi et al. | |
| 2005/0240876 A1 | 10/2005 | Myers et al. | |
| 2006/0095511 A1 | 5/2006 | Munarriz et al. | |
| 2006/0233108 A1 | 10/2006 | Krishnan | |
| 2009/0064175 A1 | 3/2009 | Taylor et al. | |
| 2009/0254572 A1 | 10/2009 | Redlich | |
| 2010/0332973 A1 | 12/2010 | Kloiber | |
| 2013/0081132 A1 | 3/2013 | Lee | |
| 2016/0232143 A1 | 4/2016 | Fickenscher et al. | |
| 2016/0162478 A1 | 6/2016 | Blassin | |
| 2016/0255076 A1 | 9/2016 | Lee | |
| 2016/0283296 A1 | 9/2016 | Ladd et al. | |
| 2017/0344526 A1 | 11/2017 | Smith | |
| 2017/0344547 A1 | 11/2017 | Smith | |
| 2017/0346828 A1 | 11/2017 | Lorensson | |

OTHER PUBLICATIONS

Office Action for U.S. Appl. No. 11/583,369, dated Apr. 3, 2009, 8 pgs.

Office Action for U.S. Appl. No. 12/573,352, dated Sep. 13, 2010, 9 pgs.

Office Action for U.S. Appl. No. 13/092,771, dated Jul. 20, 2011, 12 pgs.

Office Action for U.S. Appl. No. 13/092,771, dated Jan. 4, 2012, 13 pgs.

Office Action for U.S. Appl. No. 13/745,096, dated Sep. 30, 2013, 10 pgs.

Office Action for U.S. Appl. No. 13/454,492, dated Nov. 26, 2013, 18 pgs.

Office Action for U.S. Appl. No. 13/745,096, dated Jan. 15, 2014, 15 pgs.

Office Action for U.S. Appl. No. 13/745,096, dated Jul. 25, 2014, 16 pgs.

Office Action for U.S. Appl. No. 14/638,700, dated Mar. 26, 2015, 14 pgs.

Office Action for U.S. Appl. No. 14/638,700, dated Oct. 6, 2015, 13 pgs.

Office Action for U.S. Appl. No. 15/174,591, dated Feb. 3, 2017, 22 pgs.

Office Action for U.S. Appl. No. 15/174,591, dated Jul. 21, 2017, 19 pgs.

Müldner, Tomasz, Robin McNeill and Jan Krzysztof Miziotek in "Secure Publishing using Schema-level Role-based Access Control Policies for Fragments of XML Documents." Presented at Balisage: The Markup Conference 2008, Montréal, Canada, Aug. 12-15, 2008. In Proceedings of Balisage: The Markup Conference 2008. Balisage Series on Markup Technologies, vol. 1 (2008), doi:10.4242/BalisageVol1.Muldner01.

Office Action for U.S. Appl. No. 15/607,091, dated Mar. 19, 2018, 8 pgs.

Notice of Allowance for U.S. Appl. No. 15/174,591, dated Sep. 21, 2018, 8 pgs.

Office Action for U.S. Appl. No. 15/607,091, dated Nov. 28, 2018, 8 pgs.

Office Action for U.S. Appl. No. 15/607,111, dated Jan. 30, 2019, 55 pgs.

Office Action for U.S. Appl. No. 15/607,036, dated Apr. 17, 2019, 7 pgs.

Office Action for U.S. Appl. No. 15/607,111 dated Jul. 12, 2019, 62 pgs.

Sihem Amer-Yahia et al,, a Web-Services Architecture for Efficient XML Data Exchange, 2004, Proceedings of the 20th Int'l Conf. on Data Engineering (ICDE'04), pp. 1-12.

Notice of Allowance for U.S. Appl. No. 15/607,036, dated Jul. 18, 2019, 2 pgs.

Office Action for U.S. Appl. No, 15/607,091, dated Sep. 17, 2019, 8 pgs.

* cited by examiner

METHOD AND SYSTEM FOR TRANSFORMING INPUT DATA STREAMS

CROSS-REFERENCE TO RELATED APPLICATIONS

This application is a continuation of U.S. patent application Ser. No. 15/174,591 filed Jun. 6, 2016, and entitled "METHOD AND SYSTEM FOR TRANSFORMING INPUT DATA STREAMS," which is a continuation of U.S. patent application Ser. No. 14/638,700 filed Mar. 4, 2015, and entitled "METHOD AND SYSTEM FOR TRANSFORMING INPUT DATA STREAMS," issued as U.S. Pat. No. 9,400,703, which is a continuation of U.S. patent application Ser. No. 13/745,096, filed Jan. 18, 2013, and entitled "METHOD AND SYSTEM FOR TRANSFORMING INPUT DATA STREAMS," issued as U.S. Pat. No. 9,047,146, which is a continuation of U.S. patent application Ser. No. 13/092,771, filed Apr. 22, 2011, and entitled "METHOD AND SYSTEM FOR TRANSFORMING INPUT DATA STREAMS," issued as U.S. Pat. No. 8,380,830, which is a continuation of U.S. patent application Ser. No. 12/573,352, filed Oct. 5, 2009, abandoned, and entitled "METHOD AND SYSTEM FOR TRANSFORMING INPUT DATA STREAMS," which is a continuation of U.S. patent application Ser. No. 11/583,369, filed Oct. 19, 2006, abandoned, and entitled "METHOD AND SYSTEM FOR TRANSFORMING INPUT DATA STREAMS", which is a continuation of U.S. patent application Ser. No. 10/184,430, filed Jun. 28, 2002, entitled "METHOD AND SYSTEM FOR TRANSFORMING INPUT DATA STREAMS," issued as U.S. Pat. No. 7,127,520, all of which are incorporated herein by reference in their entirety.

BACKGROUND

The field of the invention relates to data transformation, and more particularly, to apparatus and method for transforming an input data stream in a first data format of a plurality of first data formats to an output data stream in a second data format of a plurality of second data formats.

Businesses communication has become increasingly complex. The demands of business trends such as Customer Relationship Management and Supply Chain Management combined with emerging communication technologies, which allow business partners to share information instantly, are mainly responsible for this communication evolution. The number of business partners and the means with which they collaborate (using e-mail, fax, public internet and mobile devices) are steadily increasing. Adding to this complexity, a growing number of customers and suppliers require that the communication be tailored to their specific needs. In short, businesses today need to provide communication processes that are automated and personalized. Meeting this challenge requires a new understanding of business communications in the age of the Internet. Thus, there is a need for better control of the complexity of business communication.

BRIEF DESCRIPTION OF THE DRAWINGS

The features of the invention, which are believed to be novel, are set forth with particularity in the appended claims. The invention may best be understood by reference to the following description taken in conjunction with the accompanying drawings, in the several figures of which like reference numerals identify like elements, and in which:

DETAILED DESCRIPTION

Figure 1:
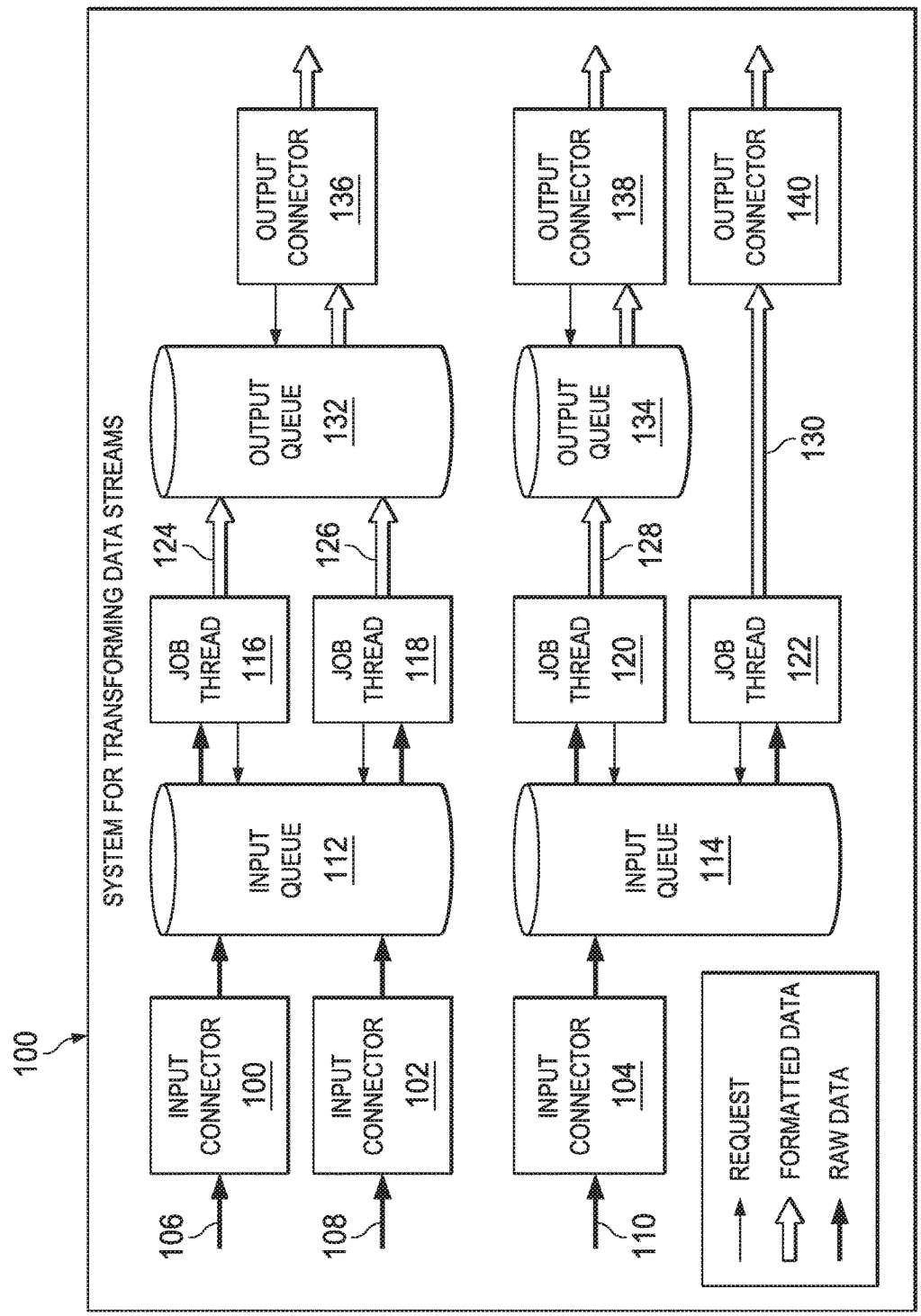
FIG. 1 is a general block diagram of one embodiment of a system for transforming an input data stream in a first data format of a plurality of first data formats to an output data stream in a second data format of a plurality of second data formats.

While the invention is susceptible of embodiments in various forms, there is shown in the drawings and will hereinafter be described some exemplary and non-limiting embodiments, with the understanding that the present disclosure is to be considered an exemplification of the invention and is not intended to limit the invention to the specific embodiments illustrated.

One embodiment of a system for transforming an input data stream in a first data format of a plurality of first data formats to an output data stream in a second data format of a plurality of second data formats is depicted in FIG. 1. A plurality of input connector modules 100, 102, 104 receive respective input data streams 106, 108, 110. A plurality of input queues 112, 114 store the received input data streams 106, 108, 110. A plurality of job threads 116, 118, 120, 122 are operatively connected to respective input queues 112, 114. Each job thread (116, 118, 120, 122) in parallel with at least one other job thread (116, 118, 120, 122) formatting a stored input data stream to produce an output data stream (124, 126, 128, 130). A plurality of output queues 132, 134 respectively store the output data streams 124, 126, 128, 130 from the plurality of job threads 116, 118, 120, 122. A plurality of output connector modules 136, 138, 140 are operatively connected to the output queues 132, 134, the output connector modules 136, 138, 140 supplying respective output data streams (124, 126, 128, 130). It is to be understood that the novel system may have any number of input connector modules 100, 102, 104, input queues 112, 114, job threads 116, 118, 120, 122, output queues 132, 134, and output connector modules 136, 138, 140. Also, there is no restriction on how they may be shared and FIG. 1 is only one example of a system configuration. Furthermore, a job thread may be directly connected to an input connector and/or to an output connector (see job thread 122 and output connector 140 in FIG. 1, for example).

Figure 2:
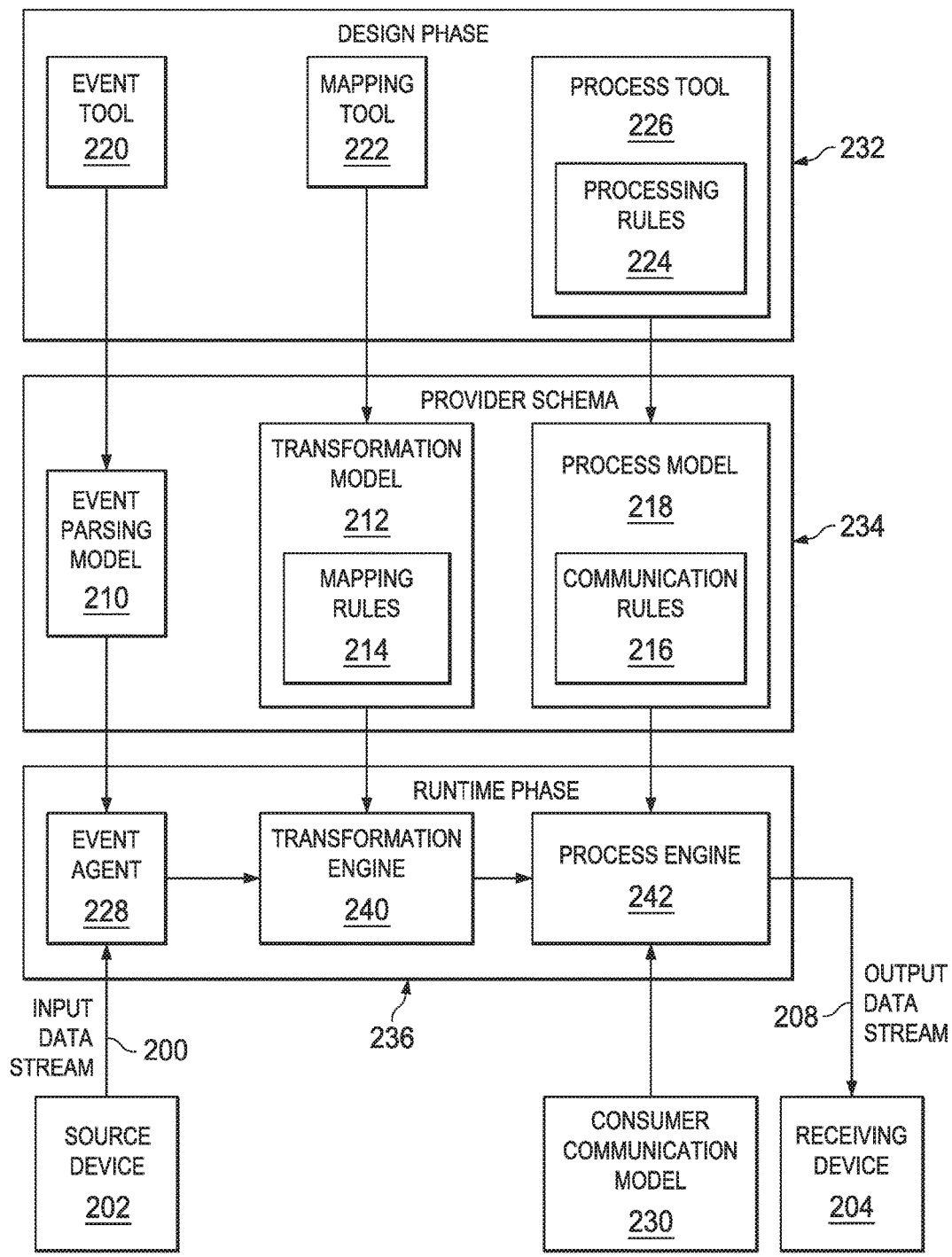
FIG. 2 is a more detailed block diagram of one embodiment of the system.

FIG. 2 depicts an embodiment of the system in more detail. An input data stream 200 from a source device 202 or application (provider) is evaluated and manipulated based on the data content, transmission protocol and data format requirements of the receiving device 204 or application (consumer). Input can originate from a number of sources, refined and then multiplexed to multiple output channels. Thus, one-to-many and many-to-many processing from provider to consumer is possible.

The input is processed according to communication rules 216, which define how the content is transformed, delivered and presented to the consumer. The communication rules 216 are applied based on matching the input from the source device 202 to the requirements of the receiving device 204 of the output data stream 208.

At runtime, the input data stream 200 is described in an event parsing model 210 and a corresponding transformation model 212 upon which the data transformation is based. The data stream is manipulated based on mapping rules 214 in the transformation model 212, communication rules 216 in the process model 218 and the content and structure of the input event.

The event parsing model 210, transformation model 212, and process model 218 are statically defined in a design phase and determine the global framework for the communication process between the provider (source device 202) and the consumer (receiving device 204). The input event parsing model 210 is defined using an event tool 220, which defines the sequences and patterns to detect in the input data stream 200. The transformation model 212 can correspond to the event parsing model 210 or can consist of a combination of events derived from the data stream or from additional mapping rules defined at design time in a mapping tool 222. The processing rules 224 for the presentation and delivery to the output data stream is defined in the process tool 226.

External communication rules for the processing and delivery of the information personalized for the consumer is derived from a matching consumer communication model 230 at run time. The consumer communication model 230 is dynamic and need not be predefined before the information is transformed or processed at runtime. The consumer communication model 230 is applied to the processing model 218 to determine the actual communication rules.

The event tool 220, the mapping tool 222, and the process tool 226 occur in the design phase 232. The event parsing model 210, the transformation model 212, and the process model 218 form the provider schema 234. In the runtime phase 236 the input data stream 200 is received by an event agent 228, which parses the input data stream 200. A transformation engine 240 effects the actual transformation of the data from one format to another format. A process engine 242 then applies the communication rules 216 and sends the output data stream 208 to the receiving device 204.

The multi-threading system increases the performance and provides support for parallel job execution. This system architecture also offers better scalability for multi-processor systems. All threads are connected to queues and/or connectors, enabling extremely flexible configuration. Several job threads can serve one or several queues and several input connectors can use one or several queues and job threads.

In one embodiment job threads pick up data from the queue in the same order as it was stored. Jobs that arrive via input connectors are stored in input queues, and job threads pick up the jobs and execute them independently of other job threads. When an input connector has written a job to a queue, that connector is immediately ready to receive more data; it does not have to wait for the system to process previous jobs. After processing, jobs are stored in output queues, from where output connectors can pick them up and pass them on to their final destination. Thus, the use of queuing is one embodiment of the system.

The following is a more detailed description of the operation of the system and method for transforming an input data stream in a first data format of a plurality of first data formats to an output data stream in a second data format of a plurality of second data formats.

Figure 3:
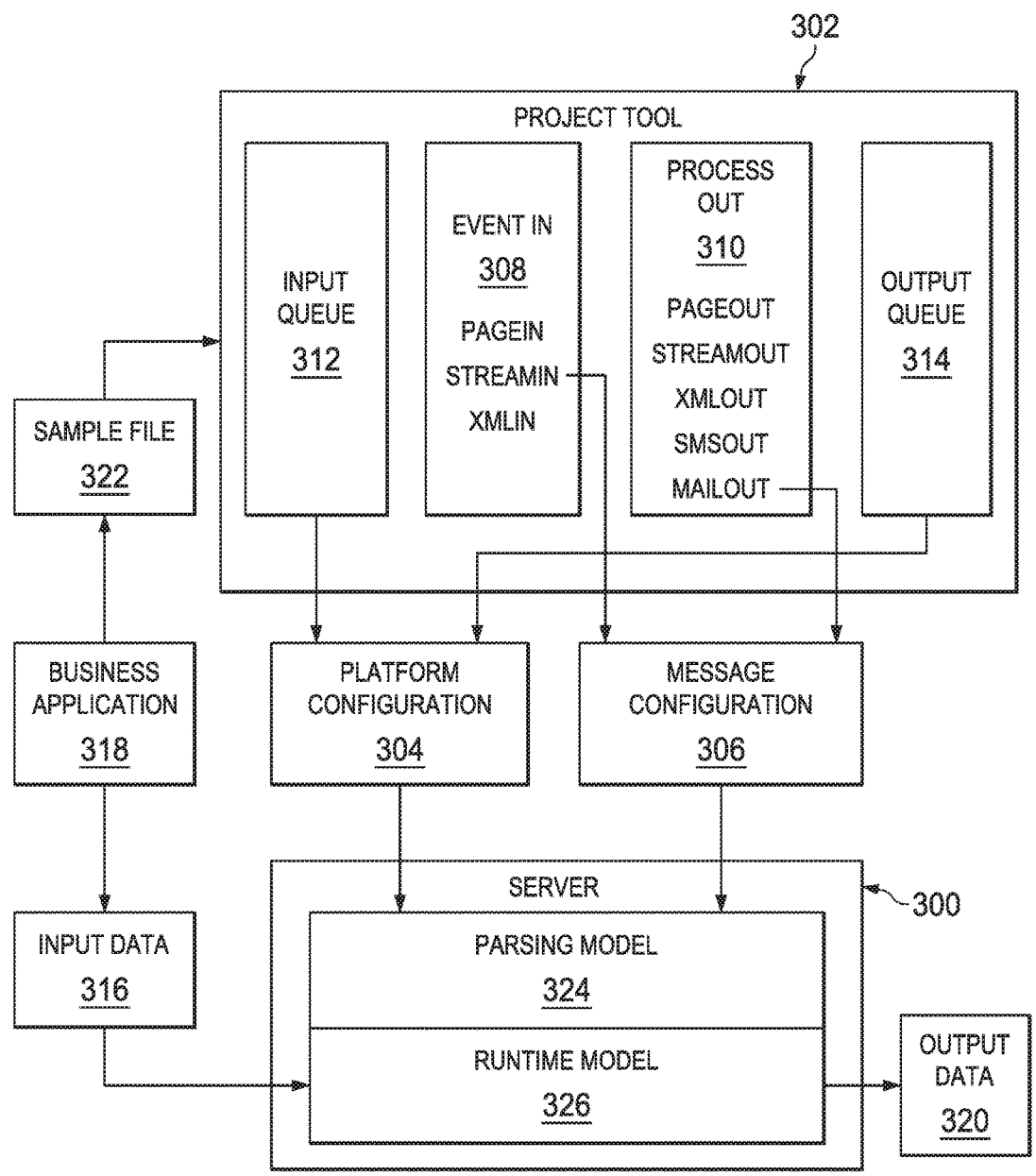
FIG. 3 is a further block diagram of an implementation of one embodiment of the system.

In the embodiment depicted in FIG. 3, the server 300 is the "main engine" and is configured using a project tool 302. All configurations are defined in the project tool 302 and then exported in two text files 304, 306 for platform configuration and message configuration to the server 300. The server 300 reads these files 304, 306 at startup and creates and connects events 308, processes 310 and queues 312, 314 according to the instructions in the files 304, 306. This embodiment focuses on how the server 300 builds its pipelines and how it processes data 316 from a business application 318 and provides output data 320. The system is applicable to other applications, which need to reformat data streams. During an initiation phase the project tool 302 uses a sample file 322 from the business application 318. As will be explained below, the server 300 has a paring model 324 and a runtime model 326.

Figure 4:
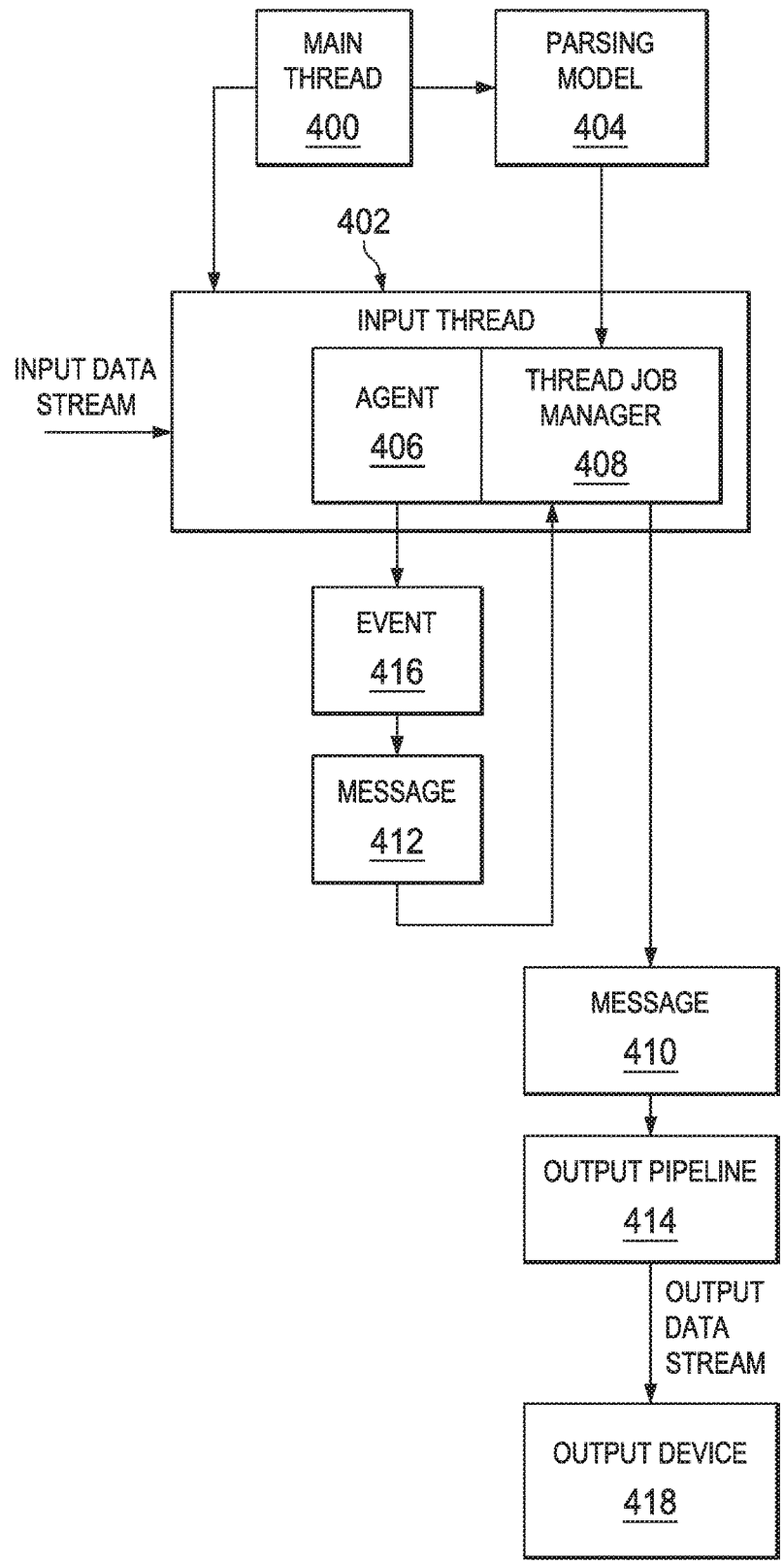
FIG. 4 is a block diagram of one embodiment of a portion of the system.
Figure 5:
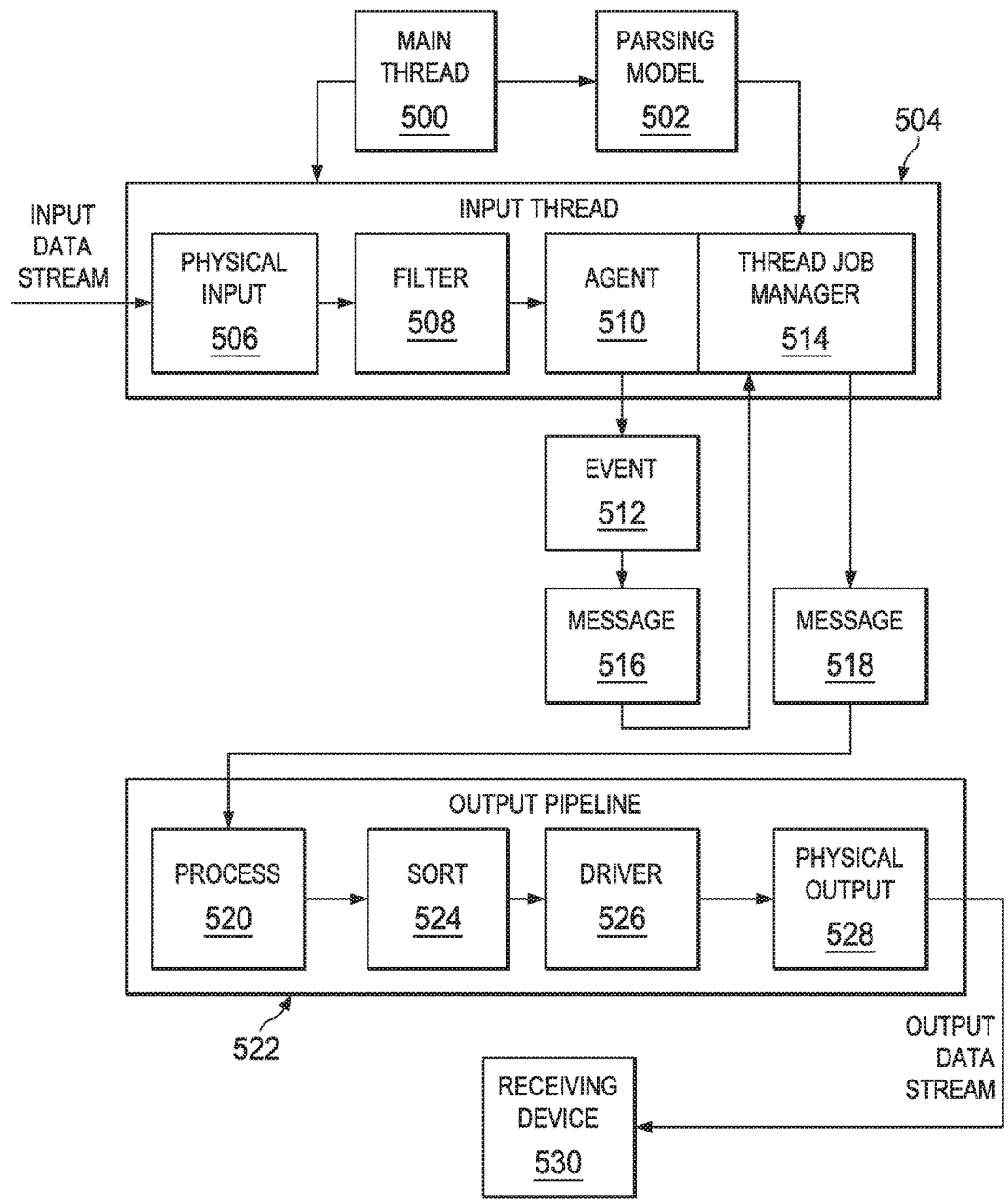
FIG. 5 is a block diagram of another embodiment of a portion of the system.

The system is multi-threading, but for the purpose of describing the operation of the system, the threading model is considered to consist of a main thread 400 and input threads, such as input thread 402 (see FIG. 4). The main thread 400 is responsible for initiation. It parses all command line options, all driver files and all export files from the project tool. Based on this information it creates the parsing model 404. Finally it creates one input thread 402 for each input queue, starts these threads and then becomes passive. It remains passive until it gets a signal that a user wants to terminate the server. When this occurs, it stops all input threads, de-allocates all resources and exits. Each input thread listens to a physical port from which it can receive data and execute any jobs found on this port.

The parsing model 404 is created as a read-only object by the main thread 400 at startup and cannot be changed. The parsing model 404 contains all the information specified by the user in the project tool. This information is exported to the server and stored in the parsing model 404.

The parsing model 404 communicates with the objects in the runtime model and provides information such as: agent information, which is information about which agent 406 a thread job manager 408 shall use; variable information, which is information about which variables to create and instantiate; message structure, which is information about how to structure a message (such as messages 410, 412); output action, which is how the process communicates with the parsing model 404 to receive instructions about which actions to take (These actions may include sending output to the output pipeline 414, running a script or carrying out sorting, for example); sorting information, which is information about whether sorting should be done or not; output pipeline objects information, which is information regarding how the thread job manager 408 creates the output pipeline 414 and makes sure that the required objects are inserted into the pipeline 414 based on information in the parsing model 404; events and processes information, which is information regarding which events 416 to detect in the data stream and which processes to launch when an event 416 is detected.

The runtime model contains components that are created at start-up and dynamic components that are created during runtime. The main thread 500 creates the parsing model 502 and all input threads, such as input thread 504. These components cannot be changed during the session. All other components, events, messages and output pipeline objects, are dynamically created at runtime.

The following is a step-by-step description of an example of the flow in one embodiment of the runtime model.

1. When the server starts, the main thread 500 creates the parsing model and all input threads 504 by using information in the files exported from the project tool. When this is done, the main thread becomes idle and listens only to a server shutdown command. When this occurs, the main thread 500 is responsible for closing all input threads 504.
2. Input data (from a business application, for example) is received by a physical input 506.
3. A filter 508 in the input thread 504 ensures that only relevant data is passed to an agent 510.
4. When the agent 510 receives the data, the collect-phase begins. In this phase the agent 510 reads the entire input file and then carries out the following steps for each event 512 in the job;
   4.1. The event 512 is identified and the data is retrieved from it.
   4.2. A field list is created for the event 512.
   4.3. The retrieved script for the event 512 is run. Once these steps have been carried out for each event 512, sorting (if any) is performed using variables set in the events 512 and the retrieved scripts.
5. The collect phase is now complete.
6. When the thread job manager 514 receives permission from the global thread manager, the first event 512 is created by the thread job manager 514. Information about how to create the event 512 is retrieved from the parsing model 502.
7. The agent 510 fills the event with fields.
8. The event 512 creates a message 516 based on the event's field list and the information in the parsing model 502. A message tree is built using fields, blocks and variables. The message 516 is then passed on to the thread job manager 514.
9. The thread job manager 514 runs "script before event".
10. The thread job manager 514 creates a process 520 by using information in the parsing model 502 and message 518.
11. The thread job manager 514 runs "script before process".
12. A check is made to determine if this process should be skipped. A skip can be forced by a rule attached to the process 520 or by executing a script function "skip ( )" in the "script before process".
13. If no skip is detected, the thread job manager 514 creates the output pipeline 522 for the process 520. This is based on the information in the parsing model 502. The process 520 is then executed according to the instructions in the parsing model 502 and in the data flow. The output pipeline 522 may contain objects, such as sort/archive 524, driver 526, physical output 528. The output pipeline 522 may be operatively connected to a receiving device 530.
14. When the process 520 is finished, "script after process" is executed.
15. Steps 12 to 14 are repeated for all processes 520 defined for the event 512.
16. When all processes 520 are created the thread job manager 514 runs "script after event".
17. Steps 9 to 16 are performed for each event 512.

Figure 6:
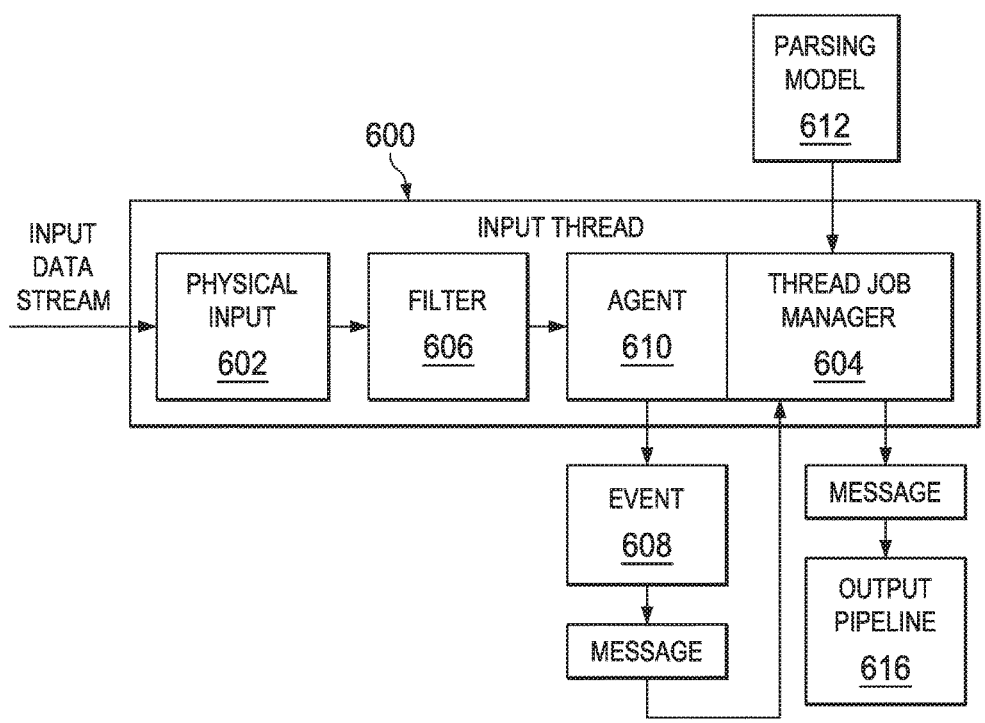
FIG. 6 is a block diagram of yet another embodiment of a portion of the system.

In another embodiment depicted in FIG. 6 an input pipeline (input thread 600) consists of a pipeline of objects that are connected through one data channel and one message channel. The pipeline 600 always starts with a physical input object 602 and ends with a thread job manager 604. Other objects can be inserted between the physical input object 602 and the thread job manager 604. These objects can perform various operations with the data as long as they send it to the next object in the pipeline. Normally these objects are filters 606 that remove unwanted data from the data channel.

Each input thread 600 consists of only one input pipeline. Its only task is to find incoming jobs arriving at the physical input object 602 and send jobs down to the different objects in the pipeline. Eventually, it reaches the thread job manager 604 that processes a job.

The physical input object 602 is a physical port through which incoming data is received. It is also the start of the input thread data, pipeline. A physical port may be one of the following types: serial (receives data directly from a serial port); directory scan (scans a file system directory for files that match a file search criterion); device (listens directly to a hardware device, e.g., a parallel port); standard input (listens to standard input); TCP/IP sockets (listens to a socket for incoming data); named pipe; (listens: to a named pipe); internal (data is sent from a server output queue in the same system); netware bindery (acts as a NetWare printer); netware NDS (acts as a NetWare NDS printer).

The physical input object 602 starts to listen for incoming data. As soon as the physical input object 602 detects an incoming job the physical input object 602 sends the job down the input thread data pipeline byte by byte as raw data. How ports are listened to depend on the type of port.

If a filter has been chosen for the input queue in project tool, an input filter object 606 is inserted in the input thread data pipeline 600 after the physical input object 602. If several filters have been chosen, several filter objects are inserted in serial in the pipeline 600.

A filter's task is to remove unwanted sequences or to convert sequences in the incoming data stream. An example of removing sequences is a filter that removes PCL escape codes and just sends the actual PCL document data to the next object in the pipeline. An example of converting is a filter that receives compressed (zipped) data and uncompresses (unzips) it before sending it to the next object.

The script language makes it possible at runtime to decide what output to produce and to which queue to send it. The script language is an event driven procedural language.

The input thread data pipeline of the input thread 600 always ends with a thread job manager 604. Each thread job manager 604 contains an agent 610. The thread job manager 604 is responsible for detecting events 608 and launching and controlling events 608 and processes.

An agent 610 is the interface between the thread job manager 604 and the input thread data pipeline and receives the incoming data. It is responsible for detecting events and extracting fields in the raw data input stream. There may be several different agents 610; each specialized for a specific type of input. For example, one agent for record based input from mainframes, another agent for XML data. The agent to use is specified in the project tool. The thread job manager 604 finds this information in the parsing model 612. In one embodiment the agent 610 receives data as one page and breaks it down into a field list.

The agent 610, when a job arrives and when events are found in the job, notifies the thread job manager 604. The thread job manager's main task is to control the execution of the job (i.e., the events, scripts, sorting and processes of the job). When executing the job, the thread job manager 604 creates events and processes and makes sure that they are executed in the right order. When processes are executed, the thread job manager 604 is also responsible for setting up the output pipeline 616 for the process.

In general, the main task for the process is to produce output and send it to an output pipeline. The data may be received as a message containing blocks that contain fields. In this embodiment the execution is block driven, meaning that the process identifies all blocks in the message and then communicates with the parsing model to get instructions about which actions to take for each block, for example, to send output to the output pipeline, to run a script or to perform sorting. The type of output created differs depending on the type of process used.

The following are examples of types of processes. The process "PageOUT produces a page layout. This is by far the most complicated process and is used for creating documents for printing, faxing, PDF, web etc. The process "StreamOUT" produces flat field and record based text files. The process "XMLOUT" produces XML output. This is a special version of "StreamOUT". The process "Mail OUT produces e-mail and can also attach the result of another process to the e-mail. The process "SMSOUT" produces SMS messages that can be sent to mobile phones.

In another embodiment output sent to the output pipeline is sent as meta records containing instructions for the device drivers. An example of a meta record is as follows: output the text ", Inc." at position x=346 and y=345 using font Arial size 10. When fields and variables are used in the output, the process retrieves the current field or variable value. This means that a reference to a field or variable is never included in meta records. Instead, the value of the field or variable is sent. To the output pipeline objects, it is transparent if it is static text or text from the incoming data that is being delivered. The device drivers convert Meta records to device specific output. The device drivers are part of the output pipeline.

In thread job execution the thread job manager splits all requests that receive and process into jobs. Each job consists of one or more events together with all processes belonging to these events. The processes can send their output to one or more output pipelines. Each of these pipelines produce one output entity for the complete job. For example if 30 invoices are received at the input pipeline and a "PageOUT" process produces 30 invoices and sends the invoices to a spooler system, these 30 invoices being sent as one print job to the spooler.

The default scope of a job is that each input file will result in one job. However, the incoming file may be split the incoming file into several smaller jobs. The smallest possible job is when the job consists of only one event. The thread job manager (actually the thread job manager agent) is responsible for deciding when a job starts and ends. Normally this is straight forward since one incoming request to a physical input object will result in one job.

There can be many reasons for dividing a large job into smaller jobs. For example, there may be one entry in the spooler system for each process, for example for each invoice. In a further embodiment some settings may be sent to the output queue. This is usually performed at the beginning of the job, for example downloading overlay files to a printer.

Figure 7:
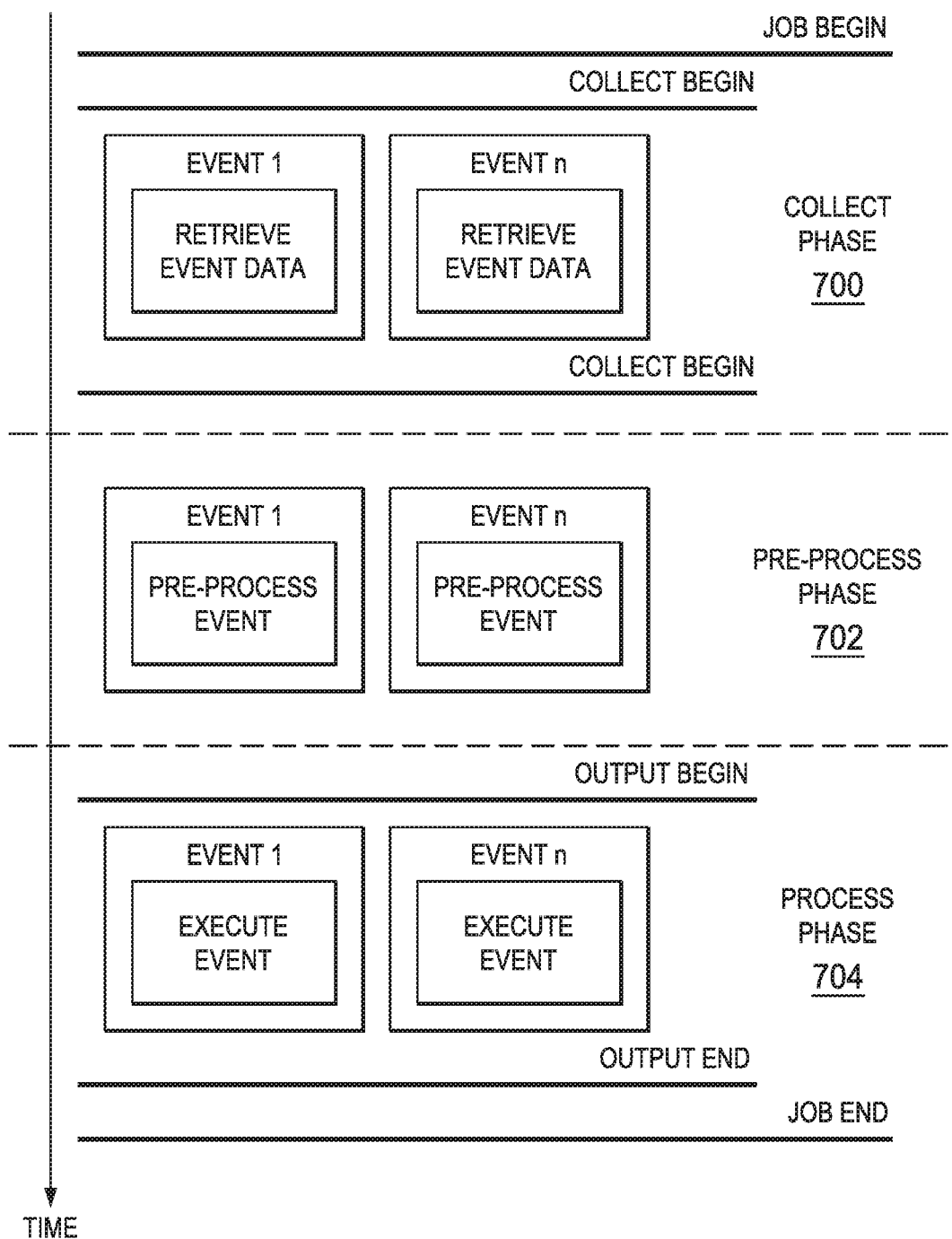
FIG. 7 is a diagram of run-time phases of an embodiment of the system.

One example of an implementation of the system occurs when an external application that is required to process an output job sends this job as one file to the system. When the agent receives the job and recognizes it as something that should trigger an event, the job begins. This sends signals to the thread job manager for the job to begin and for the collect phase 700 to begin (see FIG. 7).

The agent will now start to scan the input for fields and new events. All fields found are stored in a list that is associated with the current event. If, in the parsing model, the field is designated to create a variable, this is done at this stage. If a new event is found it will be added to a list of found events, and any fields found after this will be associated with this event. This process continues until a list of all events, with all fields, has been created. This signals an end of the collect phase 700 to the thread job manager. The Collect phase is necessary for creating this list, which in turn is used to sort the incoming events. Information is stored in the parsing model about whether or not sorting should be carried out.

The thread job manager will now pre-process all events and processes belonging to the job in a pre-process phase 702. During the pre-process phase 702 the whole job is executed, but without sending anything to the output pipeline. The pre-process phase 702 is used, for example, to calculate the number of pages and where page breaks occur and to determine which resources are to be used. A resource may, for example, be an overlay that should be sent to a printer. It is also possible to cancel the job, that is undo everything that has been done in the job and skip the rest of the input. This can be done conditionally, based on input field values, in scripts. Event and process execution is carried out in, the pre-process phase 702 in the following order:

1 The first event in the event list is pre-processed first, then all the processes for this event.
2 The next event in the event list, together with its processes, is preprocessed.
3 This continues until all the events in the list have been pre-processed.

Note that this is the order after events have been sorted. Before and after each event and process a script is run. In this script, the process can conditionally be skipped.

Now the thread job manager has stored all information needed from the pre-process phase 702 and can execute the events and processes in a process phase 704. First, it performs a rollback on everything. For example, variables are restored to their values before the pre-process phase 702 and ODBC operations that have been executed in a transaction are rolled-back. Next it sends any resources (for example, overlays) that were found during the pre-process phase 702 to the output pipeline. The events and processes are executed in the process phase 704 in the same order as in the pre-process phase 702. The difference is that this time the output is actually sent to the output pipeline. After the last process is executed, the job is complete. The thread job manager releases all resources that were temporarily assigned.

Figure 8:
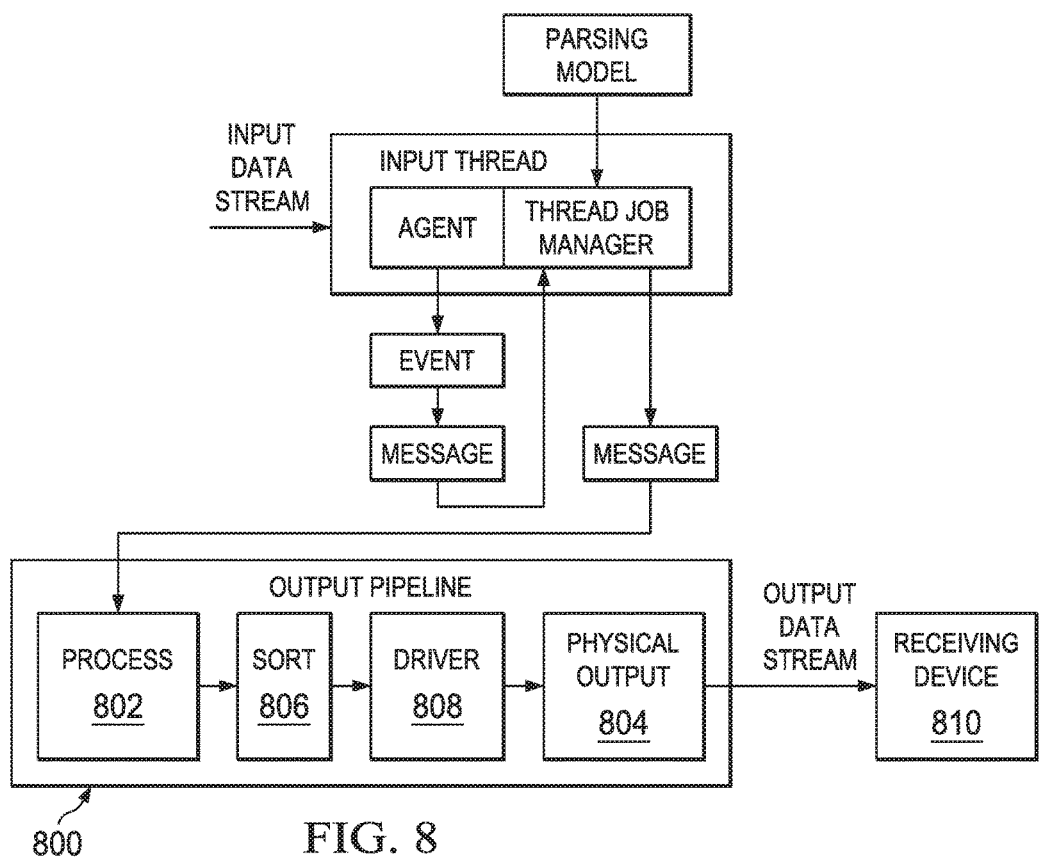
FIG. 8 is block diagram of a further embodiment of a portion of the system.

In FIG. 8 the output pipeline 800 consists of a pipeline of objects that are connected through one data channel and one message channel. The pipeline 800 always starts with a process 802 and ends with a physical output object 804. Between the process 802 and the physical output object 804 other objects may be inserted. These objects may be used to perform various operations with the data and then pass the data on to the next object in the pipeline 800. Examples of operations that may be performed in various embodiments are sorting, or splitting the pipeline into two branches (such as sorting object 806). Also one of the objects may be a device driver 808 that converts the meta data into formatted data.

The physical output object 804 always points to a physical destination, such as receiving device 810. This can, for example, be a printer or an e-mail server. The physical output object 804 is responsible for the actual delivery of the output data to its final destination.

Different objects may be included in the pipeline 800 depending on information in the parsing model. The thread job manager creates the output pipeline 800 and ensures that the required objects are inserted in the pipeline 800. The thread job manager also connects the pipeline 800 to the process 802.

In one embodiment the following rules may apply to all output pipelines in the system: Each physical output object corresponds to one, and only one, queue as defined in the parsing model. There may only be one pipeline for each physical output object. The physical output object for a pipeline is always the same throughout an entire job. The pipeline is always connected to one process at a time. These rules imply that output from different processes in the same job, that use the same physical output object, will be kept together, that is, delivered as one unit to the final destination, for example a spooler system.

In the data channel, the process sends meta records down the pipeline. If there is a device driver in the pipeline, it reformats the meta record according to the format expected by the destination. Eventually the information reaches the physical output object, which sends it to a physical destination, for example, a spooler system or a file. The message channel is used by the thread job manager to send messages to notify the objects in the pipeline when certain events occur.

Output processors or objects may be inserted anywhere in the pipeline. These processors may change the data that is sent through the data channel. It is also possible to use a pipeline without any output processors, that is a pipeline with just a device driver and a physical output object.

Thus in general terms the present system (and the corresponding method) is for transforming an input data stream in a first data format of a plurality of first data formats to an output data stream in a second data format of a plurality of second data formats. A plurality of input connector modules receive respective input data streams and at least one input queue stores the received input data streams. A plurality of job threads is operatively connected to the at least one input queue, each job thread, in parallel with at least one other job thread, formatting a stored input data stream to produce an output data stream. At least one output queue respectively stores the output data streams from the plurality of job threads. A plurality of output connector modules is operatively connected to the at least one output queue, the output connector modules supplying respective output data streams.

In an embodiment each of the job threads has at least one event agent associated with at least one parsing model, the event agent having an input port that receives an input data stream, and having an output port. At least one transformation engine is associated with at least one transformation model, the transformation engine having an input port operatively connected to the output port of the event agent. At least one process engine is associated with at least one process model, the process engine having an input port operatively connected to the output port of the transformation engine, and having an output port for supplying an output data stream. The transformation model has mapping rules for manipulating the input data stream, and the process model has communication rules for formatting the output data stream.

In another embodiment the at least one input queue may be shared between the input connector modules and the job threads, and the at least one output queue may be shared between the job threads and the output connectors. The job threads may receive input data streams in the order in which the input data streams are stored in the at least one input queue. In general, the job threads receive input data streams from the at least one input queue, format the input data streams into output data streams, and store the output data streams in the at least one output queue, independent of one another and in parallel.

It is to be understood, of course, that the invention in various embodiments can be implemented in hardware, software, or in combinations of hardware and software.

The invention is not limited to the particular details of the apparatus and method depicted, and other modifications and applications are contemplated. Certain other changes may be made in the above-described apparatus and method without departing from the true spirit and scope of the invention herein involved. It is intended, therefore, that the subject matter in the above depiction shall be interpreted as illustrative and not illuminating sense.

What is claimed is:

1. A system for processing input data streams comprising:
   an input connector;
   an output connector;
   a processing system coupled to the input connector and the output connector, the processing system having a non-transitory computer readable medium comprising instructions to:
   read an electronic input data stream of data received at the input connector;
   in a job thread, detect patterns in the input data stream to identify events;
   in the same job thread, create a message for each event, the message containing data associated with the event according to a generic data structure corresponding to the event;
   in the same job thread, execute a process configured to generate a meta record based on the message and send the meta record to an output pipeline; and
   provide an output data stream to a destination from the output pipeline via the output connector, wherein at least a portion of the output data stream contains data from the message converted according to the meta record.

2. The system of claim 1, wherein the output data stream comprises data not contained in the data associated with the event.

3. The system of claim 1; wherein the processing system is coupled to the input connector via an input queue the processing system is coupled to the output connector via an output queue.

4. The system of claim 3, wherein the input connector and output connector are physical connectors.

5. The system of claim 1, wherein the instructions are further for splitting the data received at the input connector into a plurality of jobs, wherein the job thread corresponds to one of the plurality of jobs.

6. The system of claim 1, wherein the job thread includes a plurality of job threads, each of the plurality of job threads processing a portion of the identified events.

7. A method for processing a data stream in a network environment comprising:
   reading an electronic input data stream of data received at an input connector;
   in a job thread on a process system, detecting patterns in the input data stream to identify events;
   in the same job thread, creating a message for each event, the message containing data associated with the event according to a generic data structure corresponding to the event;

in the same job thread, executing a process configured to generate a meta record based on the message and send the meta record to an output pipeline; and providing an output data stream to a destination from the output pipeline via an output connector, wherein at least a portion of the output data stream contains data from the message converted according to the meta record.

8. The method of claim 7, wherein the output data stream comprises data not contained in the data associated with the event.

9. The method of claim 7, wherein the processing system is coupled to the input connector via an input queue, and the processing system is coupled to the output connector via an output queue.

10. The method of claim 9, wherein the input connector and output connector are physical connectors.

11. The method of claim 7, wherein the method further comprises splitting the data received at the input connector into a plurality of jobs, wherein the job thread corresponds to one of the plurality of jobs.

12. The method of claim 7, wherein the job thread includes a plurality of job threads, each of the plurality of job threads processing a portion of the identified events.

13. A non-transitory computer readable medium comprising a set of computer readable instructions for:

reading an electronic input data stream of data received at an input connector;

in a job thread on a processing system, detecting patterns in the input data stream to identify events; in the same job thread, creating a message for each event, the message containing data associated with the event according to a generic data structure corresponding to the event;

in the same job thread, executing a process configured to generate a meta record based on the message and send the meta record to an output pipeline; and providing an output data stream to a destination from the output pipeline via an output connector, wherein at least a portion of the output data stream contains data from the message converted according to the meta record.

14. The non-transitory computer readable medium of claim 13, wherein the output data stream comprises data not contained in the data associated with the event.

15. The non-transitory computer readable medium of claim 13, wherein the processing system is coupled to the input connector via an input queue, and the processing system is coupled to the output connector via an output queue.

16. The non-transitory computer readable medium of claim 15, wherein the input connector and output connector are physical connectors.

17. The non-transitory computer readable medium of claim 13, wherein the instructions are further for splitting the data received at the input connector into a plurality of jobs, wherein the job thread corresponds to one of the plurality of jobs.

18. The non-transitory computer readable medium of claim 13, wherein the job thread includes a plurality of job threads, each of the plurality of job threads processing a portion of the identified events.

* * * * *